United States Patent
Nissato

(10) Patent No.: US 9,126,582 B2
(45) Date of Patent: Sep. 8, 2015

(54) CONTROL APPARATUS FOR A HYBRID VEHICLE

(71) Applicant: MITSUBISHI JIDOSHA KOGYO KABUSHIKI KAISHA, Tokyo (JP)

(72) Inventor: Yukihiro Nissato, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 240 days.

(21) Appl. No.: 13/848,459

(22) Filed: Mar. 21, 2013

(65) Prior Publication Data

US 2013/0311018 A1    Nov. 21, 2013

(30) Foreign Application Priority Data

May 15, 2012    (JP) ................. 2012-111144

(51) Int. Cl.
*B60W 20/00* (2006.01)
*B60K 6/442* (2007.10)
*B60W 10/02* (2006.01)
*B60W 10/06* (2006.01) *B60W 10/08* (2006.01)
*B60W 10/26* (2006.01)

(52) U.S. Cl.
CPC ............. *B60W 20/10* (2013.01); *B60K 6/442* (2013.01); *B60W 10/02* (2013.01); *B60W 10/06* (2013.01); *B60W 10/08* (2013.01); *B60W 10/26* (2013.01); *B60W 20/00* (2013.01); *B60W 20/40* (2013.01); *B60W 2510/0208* (2013.01); *B60W 2510/0283* (2013.01); *B60W 2710/0677* (2013.01); *Y02T 10/6234* (2013.01); *Y02T 10/6286* (2013.01); *Y10S 903/903* (2013.01)

(58) Field of Classification Search
CPC ..... B60W 20/10; B60W 10/06; B60W 10/08; B60W 20/00; B60W 10/02; B60W 20/40; B60W 2710/0644; B60W 2710/081; B60W 2510/0638

USPC .............. 180/243, 383, 65.21, 65.225, 65.23, 180/65.235, 65.245; 477/3, 15, 5, 6, 7; 701/22, 55, 59, 68

See application file for complete search history.

(56) References Cited

U.S. PATENT DOCUMENTS

| 6,175,785 | B1 * | 1/2001 | Fujisawa et al. ................. 701/22 |
| 7,226,383 | B2 | 6/2007 | Namba |
| 2010/0094494 | A1 * | 4/2010 | Jerwick ............................ 701/22 |
| 2010/0125021 | A1 * | 5/2010 | Matsubara et al. ................ 477/5 |
| 2010/0133027 | A1 * | 6/2010 | Hung et al. ................. 180/65.23 |
| 2012/0290191 | A1 * | 11/2012 | Kobayashi .................... 701/102 |

FOREIGN PATENT DOCUMENTS

| JP | 2005-130564 A | 5/2005 |
| JP | 2007-320388 A | 12/2007 |

* cited by examiner

*Primary Examiner* — Helal A Algahaim
*Assistant Examiner* — Jelani Smith
(74) *Attorney, Agent, or Firm* — Birch, Stewart, Kolasch & Birch, LLP

(57) ABSTRACT

A control apparatus for a hybrid vehicle includes an engine, a clutch, an electric motor, an arithmetic unit, and an engine controlling unit. The motor transmits motive power on a driving wheel side of the clutch. A first traveling mode wherein the vehicle is driven by the motor and a second traveling mode wherein the vehicle is driven by the engine are provided. The arithmetic unit calculates a first target power before the clutch engages upon changeover from the first traveling mode to the second traveling mode, the first target power being for driving by the engine after the clutch engaged. The engine controlling unit controls, before the engagement of the clutch, output motive power of the engine to a second target power that is set equal to or higher than the first target power. By the configuration, the traveling performance upon changeover of the clutch is improved.

7 Claims, 5 Drawing Sheets

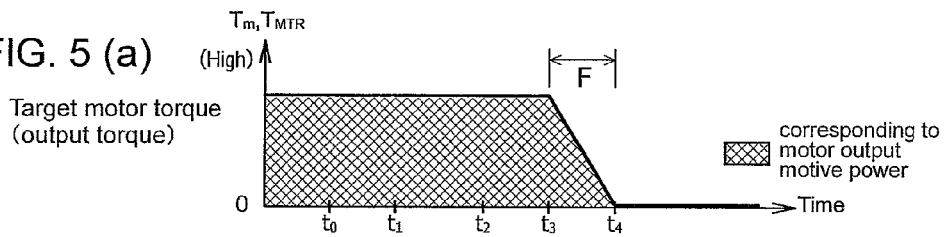
FIG. 5 (a) Target motor torque (output torque)
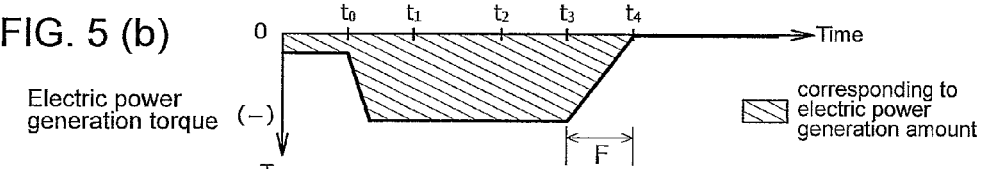
FIG. 5 (b) Electric power generation torque
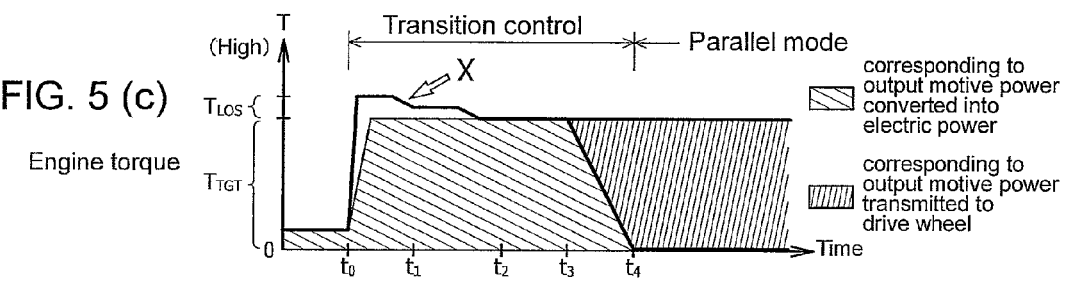
FIG. 5 (c) Engine torque
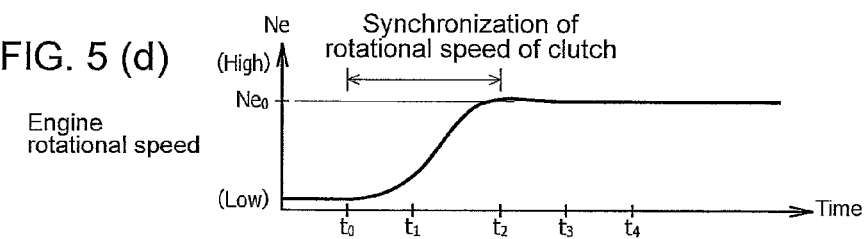
FIG. 5 (d) Engine rotational speed
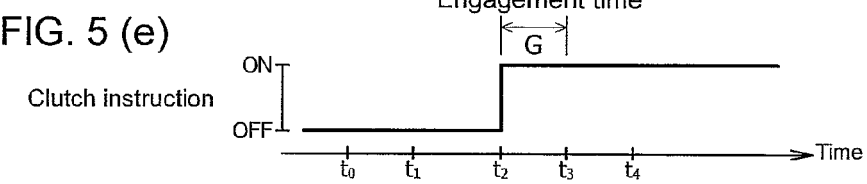
FIG. 5 (e) Clutch instruction
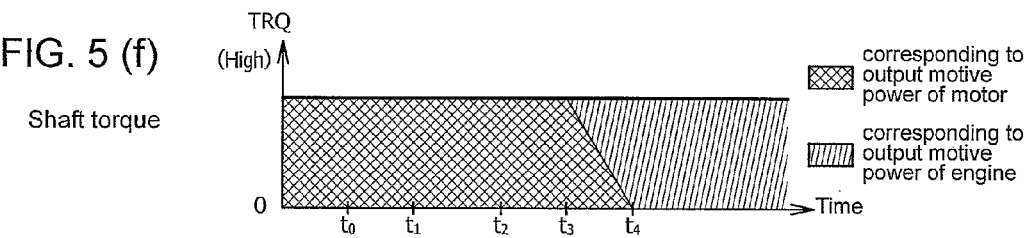
FIG. 5 (f) Shaft torque

CONTROL APPARATUS FOR A HYBRID VEHICLE

CROSS-REFERENCE TO THE RELATED APPLICATION

This application incorporates by reference the subject matter of Application No. 2012-111144 filed in Japan on May 15, 2012 on which a priority claim is based under 35 U.S.C. §119(a).

FIELD

The present invention relates to a control apparatus for a hybrid vehicle that includes an engine and an electric motor.

BACKGROUND

Conventionally, a hybrid vehicle is known that incorporates an engine and an electric motor as driving sources for the vehicle, which are changed over for use in response to a traveling condition of the vehicle. In particular, when the vehicle starts or travels at a low speed, the electronic motor that has a characteristic that it outputs high torque in a low rotational region is used, and then at a stage at which the vehicle speed becomes somewhat higher, the engine that has a torque characteristic favorable in a high rotational region is used. By selectively using the driving sources in accordance with the torque characteristics, the vehicle can be driven to travel efficiently under all conditions.

Incidentally, in a power train of such a hybrid vehicle as described above, a clutch is disposed on a power transmission path from the engine to a driving wheel, and the electric motor is connected to the power transmission path on the driving wheel side with respect to the clutch. The clutch is controlled to a released state, namely, to a disengaging state, when the engine is not used. When the engine is used, the clutch is controlled to a connected state, namely, an engaging state. Further, when the clutch engagement/disengagement state is to transit from the released state to the connected state, control for synchronizing the rotational speed of the input side and the output side of the clutch is carried out.

For example, Patent Document 1 (Japanese Patent Laid-Open No. 2005-130564) discloses a hybrid vehicle that includes a coupling that functions as a clutch. According to this technology, the coupling is connected after the rotational speed of the input shaft side and the rotational speed of the output shaft side of the coupling are synchronized with each other, and after the coupling is engaged, the torque of the electric motor and the engine is controlled. Similarly, also in Patent Document 2 (Japanese Patent Laid-Open No. 2007-320388), when the rotational speeds of a rotational element on the engine side and a rotational element on the motor side both built in a clutch become substantially equal to each other, control of engaging the rotational elements with each other is carried out. Such control prevents occurrence of a significant torque shock due to changeover between the connected and released states of the clutch.

However, in such a conventional hybrid vehicle as described above, since the output motive power of the engine is controlled after the clutch is connected substantially fully, a slow-going feeling or an idly traveling feeling in acceleration sometimes occurs immediately after changeover between the connected and released states is carried out. For example, if the accelerator pedal is operated while the clutch is in a released state, then there is the possibility that the torque transmitted to the driving shaft may be insufficient in comparison with the torque required by the driver. This state wherein the torque is insufficient continues until a state wherein the clutch is connected substantially fully is established.

On the other hand, in order to eliminate such insufficient torque as described above, it seems advisable to vary the output motive power of the electric motor or the engine in accordance with the torque required by the driver. However, the variation of the output motive power of the electric motor or the engine makes it difficult to cause the rotational elements of the clutch to rotate synchronously. Accordingly, a torque shock is liable to arise and the clutch cannot be connected smoothly. Further, the control time to change the state of the clutch between the connected and released states is sometimes elongated.

SUMMARY

Technical Problems

The present invention has been made in view of such a subject as described above, and it is one of objects of the present invention to provide a control apparatus for a hybrid vehicle that can improve the traveling performance of the hybrid vehicle upon changeover of a clutch. It is to be noted that, in addition to the object just described, it can be positioned as another object of the present invention to achieve a working-effect that is derived from configurations indicated by an embodiment of the present invention hereinafter described but cannot be achieved by the prior art.

Solution to Problems (1) A control apparatus for a hybrid vehicle disclosed herein includes an engine that transmits motive power to a driving wheel of the vehicle, a clutch disposed on a power transmission path between the engine and the driving wheel, and an electric motor that transmits motive power to the driving wheel on the driving wheel side with respect to the clutch.

The control apparatus further includes an arithmetic unit that calculates a first target power before engagement of the clutch, upon changeover from a first traveling mode (e.g. "EV mode (electric vehicle mode)", "series mode") wherein the vehicle is driven by the electric motor to a second traveling mode (e.g. "parallel mode") wherein the vehicle is driven by the engine. The first target power is for driving the vehicle by the engine after the engagement of the clutch.

The control apparatus further includes an engine controlling unit that controls, before the engagement of the clutch, output motive power of the engine to a second target power that is set equal to or higher than the first target power calculated by the arithmetic unit.

(2) Preferably, the control apparatus further includes a generator that generates electric power by the motive power of the engine to charge a battery that supplies electric power to the electric motor, and a generator controlling unit that drives, before the engagement of the clutch, the generator by the output motive power of the engine corresponding to the first target power to generate electric power (for example, carries out variable electric power generation control).

(3) Further preferably, when the battery has a charging rate equal to or lower than a criterion value (a certain value, a predetermined value, an appointed value, a calculated value), the generator controlling unit controls the generator to generate electric power (for example, carries out the variable electric power generation control described above).

(4) Preferably, the control apparatus further includes an electric motor controlling unit that controls, upon changeover from the first traveling mode to the second traveling mode, the electric motor to reduce output torque after the engagement of the clutch, wherein the generator controlling unit controls the generator to reduce output electric power simultaneously when the electric motor controlling unit controls the electric motor to reduce the output torque.

(5) Preferably, the control apparatus further includes a clutch controlling unit that controls, upon changeover from the first traveling mode to the second traveling mode, the clutch to engage when a rotational speed difference between the engine side and the electric motor side of the clutch becomes equal to or lower than a criterion value (a certain value, predetermined value, an appointed value, a calculated value).

(6) Preferably, the control apparatus further includes a changeover decision unit that decides based on a traveling speed of the vehicle whether or not changeover from the first traveling mode to the second traveling mode is to be carried out.

(7) Preferably, the changeover decision unit decides whether or not the changeover is to be carried out based on a relationship in magnitude between a decision vehicle speed and a traveling speed of the vehicle, the decision vehicle speed set in response to a charging rate or a temperature of a second battery that is an electric power supply to the electric motor.

Advantageous Effects

With the control apparatus for a hybrid vehicle disclosed herein, since the engine torque is set to a sufficiently high level before the traveling mode is changed over, the vehicle can be made travel by the just enough engine torque (without excess or deficiency) from time immediately after the changeover. Consequently, a slow-going feeling or an idly traveling feeling can be eliminated. In particular, in comparison with an alternative control technique wherein the engine output motive power is adjusted after changeover of the traveling mode, the shaft torque variation before and after the changeover can be suppressed and the traveling performance can be improved.

BRIEF DESCRIPTION OF THE DRAWINGS

The nature of this invention, as well as other objects and advantages thereof, will be explained in the following with reference to the accompanying drawings, wherein like reference characters designate the same or similar parts throughout the figures and wherein:

FIG. 2(b) is a graph exemplifying a relationship between a battery temperature and a second decision vehicle speed;

FIG. 5 are graphs illustrating control contents carried out by the control apparatus of FIG. 1, and wherein FIG. 5 (a) illustrates target motor torque and so forth; FIG. 5(b) illustrates generator torque; FIG. 5(c) illustrates engine torque; FIG. 5(d) illustrates an engine speed; FIG. 5(e) illustrates a clutch instruction; and FIG. 5(f) illustrates shaft torque.

DESCRIPTION OF EMBODIMENTS

A control apparatus for a hybrid vehicle is described with reference to the drawings. It is to be noted that embodiments described below are merely illustrative to the end and it is not intended to exclude various modifications and technical applications that are not demonstrated in the embodiments described below. The configurations of the embodiments can be carried out in various modified forms without departing from the subject matter of them and can be selectively applied as occasion demands or can be combined suitably.

1. Vehicle

Figure 1:
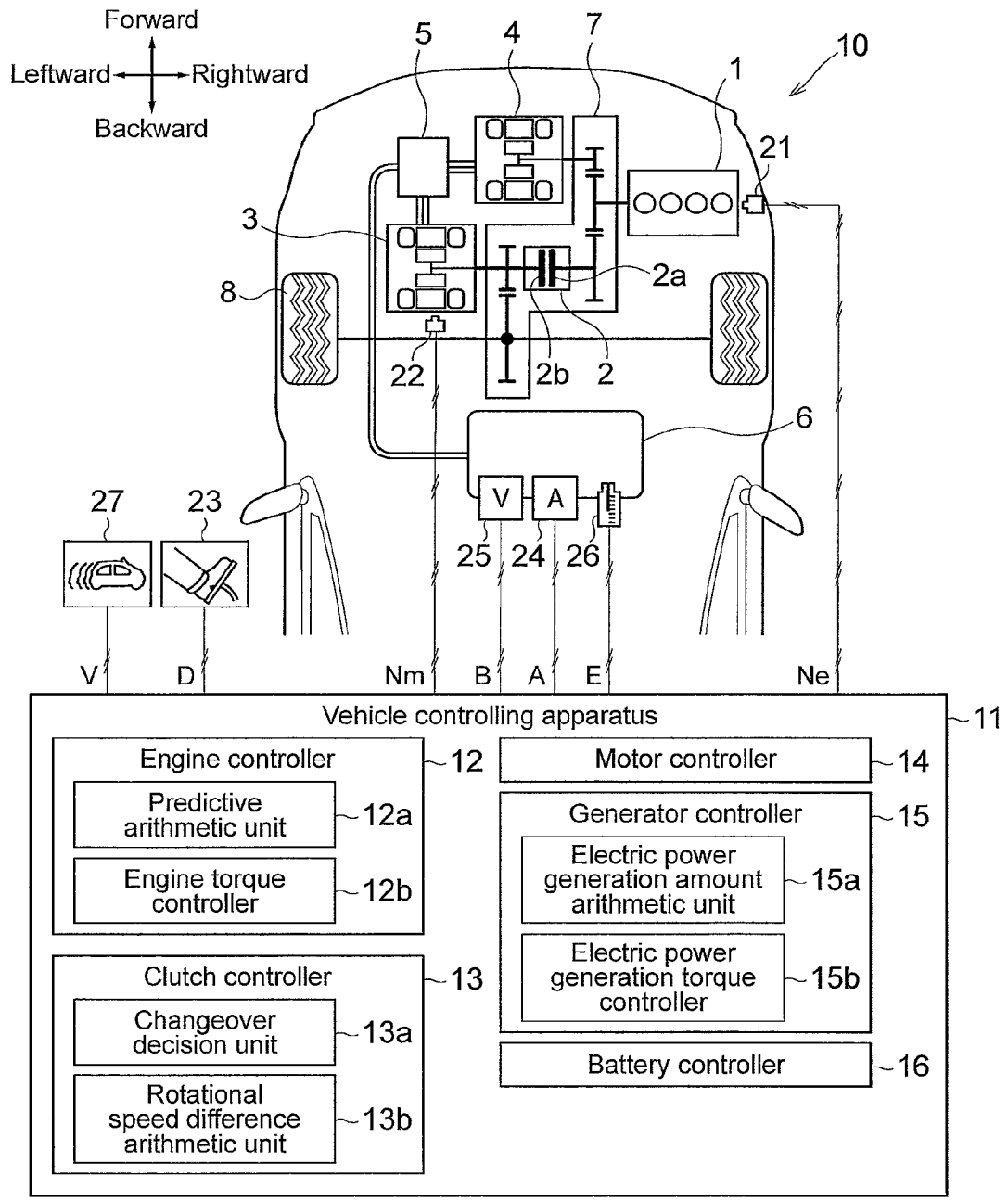
FIG. 1 is a block diagram illustrating a configuration of a control apparatus for a hybrid vehicle according to an embodiment.

A control apparatus for a hybrid vehicle according to a first embodiment is applied to a vehicle 10 illustrated in FIG. 1. The vehicle 10 is a hybrid vehicle of the FF type (front-engine, front-wheel drive layout) wherein an engine 1 and a motor 3 (electric motor) are used as driving sources and front wheels are used as driving wheels 8. A power train of the vehicle 10 includes the engine 1, the motor 3, a generator 4 (electric generator), an inverter 5, a battery 6 and a transaxle 7. The driving power of the engine 1 and the motor 3 is transmitted to the driving wheels 8 through the transaxle 7 to drive the vehicle 10 to travel.

The engine 1 is an internal combustion engine (gasoline engine or diesel engine) wherein gasoline or gas oil is used as fuel. An engine speed sensor 21 for detecting an engine speed Ne (engine rotational speed) is provided for the engine 1. Information of the engine speed Ne detected by the engine speed sensor 21 is transmitted to a vehicle controlling apparatus 11 hereinafter described.

The motor 3 is an electric motor that receives supply of electric power stored in the battery 6 or electric power generated by the generator 4 to generate motive power and is, for example, a permanent magnet synchronous motor of high output motive power. A motor speed sensor 22 for detecting a motor speed Nm (motor rotational speed) is provided for the motor 3. Also information of the motor speed Nm detected by the motor speed sensor 22 is transmitted to the vehicle controlling apparatus 11.

The battery 6 (battery, second battery) is an electrical storage device of a high energy density and a high performance such as, for example, a lithium-ion battery or a nickel-metal hydride battery and supplies electric power to the motor 3. The battery 6 has built therein a battery current sensor 24 for detecting a current value A of current in charge and discharge, a battery voltage sensor 25 for detecting a voltage value B, and a battery temperature sensor 26 for detecting an battery temperature E. Information of the current value A, voltage value B and battery temperature E detected by the sensors 24 to 26 is transmitted to the vehicle controlling apparatus 11.

The generator 4 is an AC motor-generator (an alternating-current motor-generator, a dynamoelectric machine) having both of a function as a starter for starting up the engine 1 and a function as an electric power generator. The generator 4 carries out electric power generation by motive power of the engine 1 when the engine 1 operates. The generator 4 further has a function of charging the battery 6 that serves as an electric power supplying source to the motor 3 and a function of supplying electric power directly to the motor 3.

The inverter 5 is disposed in an electric circuit that connects the motor 3, generator 4 and battery 6. Electric current exchanged on the battery 6 side with respect to the inverter 5 is DC current, and electric current exchanged on the motor 3 and generator 4 side with respect to the inverter 5 is AC current. The inverter 5 carries out DC-AC conversion between the DC (direct-current) electricity and the AC electricity. Further, the rotational speed of the motor 3 increases in proportion to the AC frequency of the electric current supplied to the motor 3. Accordingly, it is possible to adjust the rotational speed and the torque of the motor 3 by controlling the inverter 5.

The transaxle 7 is a motive power transmission apparatus wherein a final drive (final reduction gear) including a differential gear (differential apparatus) and a transmission (reduction gear) are formed integrally, and has built therein a plurality of mechanisms that take charge of motive power transmission between the driving sources and the driving wheels 8. Further, a clutch 2 is provided inside the transaxle 7.

The clutch 2 is a coupling device that controls the state of the motive power of the engine 1 between the connected and released states. The clutch 2 is disposed in the motive power transmission path from the engine 1 to the driving wheels 8. As illustrated in FIG. 1, the motor 3 is connected to a portion of the motive power transmission path on the driving wheels 8 side with respect to the clutch 2. Accordingly, the driving force of the motor 3 can be transmitted to the driving wheels 8 side independently of the connected or released state of the clutch 2. On the other hand, the driving force of the engine 1 can be transmitted to the driving wheels 8 side only when the clutch 2 is in an engaging state.

In the inside of the clutch 2, an engaging element 2a and another engaging element 2b are provided. The engaging element 2a is on the driving side. The driving force from the engine 1 is inputted to the engaging element 2a. Another engaging element 2b is on the driven side. The driving force is outputted from another engaging element 2b to the driving wheels 8 side while these elements engage.

The engaging elements 2a and 2b are driven to move in a direction toward or away from each other (namely, in an engaging or disengaging direction) in response to a clutch hydraulic pressure applied from a clutch hydraulic pump not illustrated.

Further, at arbitrary positions of the vehicle 10, an accelerator position sensor 23 for detecting an accelerator opening D corresponding to an operation amount of the accelerator pedal and a vehicle speed sensor 27 for detecting a vehicle speed V are provided. Information of the accelerator opening D and the vehicle speed V is transmitted to the vehicle controlling apparatus 11.

[2. Control Apparatus]
[2-1. Outline]

The vehicle controlling apparatus 11 is an electronic controlling apparatus that totally manages operation of the components of the power train and is configured, for example, as an LSI (large scale integrated) device or an embedded electronic device wherein a microprocessor, CPU (central processing unit), a ROM (read-only memory), a RAM (random-access memory) and so forth are integrated. The vehicle controlling apparatus 11 selects a traveling mode in response to a traveling condition or a driving condition of the vehicle 10 and controls the operation state and the output motive power of the engine 1, the connected/released state of the clutch 2, the output motive power of the motor 3, the generated electric power amount by the generator 4 and so forth in response to the traveling mode.

As the traveling mode of the vehicle 10, an EV mode, a series mode (first traveling mode), a parallel mode (second traveling mode) and so forth are set. The EV mode is a mode wherein the vehicle 10 is driven to travel only by the driving force of the motor 3 and control similar to that by a driving technique of an electric vehicle (EV) is carried out. The EV mode is selected principally when the charging rate of the battery 6 is sufficiently high and the traveling speed (vehicle speed) of the vehicle 10 is under (equal to or lower than) a decision vehicle speed $V_0$. That is, the EV mode is selected if charging rate is high enough and $V \leq V_0$. In the EV mode, the engine 1 remains in a stopping state and the clutch 2 is in a released state (disengaged). Further, the output motive power of the motor 3 is controlled to increase or decrease in response to output motive power required for the vehicle 10 (required output motive power that is set, for example, based on the accelerator opening D or the vehicle speed V).

The series mode is a mode wherein electric power generation is carried out by the motive power of the engine 1 during traveling by the driving force of the motor 3. In the series mode, the clutch 2 is controlled to a released state (disengaged), and the motive power transmission path on the engine 1 side and the motive power transmission path on the driving wheels 8 side with respect to the clutch 2 are separated from each other in the inside of the transaxle 7. Further, in the former motive power transmission path, the driving force of the engine 1 is transmitted to the generator 4 so that electric power generation is carried out by the generator 4.

The electric power generated by the generator 4 is charged into the battery 6 through the inverter 5 or is supplied directly to the motor 3 from the inverter 5. The series mode is selected principally when the traveling speed (vehicle speed) of the vehicle 10 is equal to or lower than the decision vehicle speed $V_0$ (that is, $V \leq V_0$) and the charging rate of the battery 6 is not sufficiently high (when the battery remaining capacity is rather low). For example, when the charging rate of the battery 6 becomes low during traveling in the EV mode, the traveling mode is changed from the EV mode to the series mode.

The parallel mode is a mode wherein both of the engine 1 and the motor 3 are used for traveling. In the parallel mode, the clutch 2 is controlled to an engaging state so that the driving force of the engine 1 is transmitted to the driving wheels 8. Meanwhile, the output motive power of the motor 3 is controlled to increase or decrease in response to output motive power required for the vehicle 10. Typically, the difference of the output motive power of the engine 1 from the output motive power required for the vehicle 10 is used as the output motive power of the motor 3. The parallel mode is selected principally when the traveling speed (vehicle speed) of the vehicle 10 is higher than the decision vehicle speed $V_0$ (that is, $V > V_0$). For example, when the vehicle speed increases until it exceeds the decision vehicle speed $V_0$ during traveling in the EV mode or the series mode, the traveling mode is changed to the parallel mode.

The EV mode and the series mode (first traveling mode) are modes wherein the vehicle 10 is driven to travel principally by the motor 3. In contrast, the parallel mode (second traveling mode) is a mode wherein the vehicle 10 is driven to travel principally by the engine 1, and the motor 3 is not rendered operative unless the output motive power of the engine 1 becomes insufficient. The motive power of the motor 3 in the parallel mode is used supplementarily when the output motive power required for the vehicle 10 cannot be covered only by the engine 1.

Upon transition from the EV mode or the series mode to the parallel mode, the connected/released state of the clutch 2 is changed over from the disengaging state to the engaging state to change over the driving source that primarily drives the vehicle 10. The vehicle controlling apparatus 11 carries out "transition control" in order to prevent occurrence of a sudden change of the driving force or a torque shock upon such changeover. In the present embodiment, the transition control carried out upon transition from the series mode to the parallel mode is described in detail.

[2-2. Control Block]

In the transition control, the clutch hydraulic pressure is controlled so that the clutch 2 in a released state may be engaged, and an ignition system, a fuel system, intake and exhaust systems and a valve system of the engine 1 are controlled so that the output motive power of the engine 1 may increase in response to the output motive power required for the vehicle 10. Further, the output motive power of the motor 3 is controlled so as to have a magnitude for compensating for the shortfall of the engine output motive power with reference to the output motive power required for the vehicle 10.

In order to carry out the transition control, the vehicle controlling apparatus 11 includes an engine controller 12, a clutch controller 13, a motor controller 14, a generator controller 15 and a battery controller 16. The components mentioned of the vehicle controlling apparatus 11 may be implemented by electronic circuitry (hardware), or may be programed as software, or else, some of the functions may be provided as hardware while the other functions are provided as software.

The engine controller 12 controls operation of the engine 1. As illustrated in FIG. 1, the engine controller 12 includes a predictive arithmetic unit 12a and an engine torque controller 12b.

The predictive arithmetic unit 12a (arithmetic unit) previously calculates a target torque $T_{TGT}$ before the engagement of the clutch 2. The target torque $T_{TGT}$ is a target value of the engine output motive power for driving the vehicle 10 by the engine 1 after the engagement of the clutch 2.

The target torque $T_{TGT}$ is predicted and calculated, for example, based on the vehicle speed V and/or the accelerator opening D or calculated as a value corresponding to the output motive power of the motor 3 at the point of time. The target value of the engine output motive power after the engagement of the clutch 2 (first target power) may be represented by the product of the target torque $T_{TGT}$ and the engine speed Ne at the point of time. That is, the target value of the engine output motive power may be represented as energy. The value of the target torque $T_{TGT}$ calculated here is transmitted to the engine torque controller 12b.

The engine torque controller 12b (engine controlling unit) controls the fuel injection amount, ignition timing, intake air amount and so forth to control the magnitude of the torque to be actually outputted from the engine 1. Here, the sum of the target torque $T_{TGT}$ calculated by the predictive arithmetic unit 12a and a criterion torque loss $T_{LOS}$ is calculated as controlling target torque T. The torque loss $T_{LOS}$ corresponds to torque that is lost when the rotational speeds of the engaging elements 2a and 2b of the clutch 2 are to be synchronized with each other. The torque loss $T_{LOS}$ is a value calculated based on the rotational speeds of or the speed difference between the engaging elements 2a and 2b.

In the present embodiment, the torque loss $T_{LOS}$ is calculated, for example, based on the vehicle speed V, engine speed Ne, accelerator opening D and so forth. Further, the torque loss $T_{LOS}$ has a value at least equal to or higher than 0 ($T_{LOS} \geq 0$). Accordingly, the output motive power (second target power) represented by the product of the sum of the target torque $T_{TGT}$ and the torque loss $T_{LOS}$ and the engine speed Ne at the point of time (($T_{TGT}+T_{LOS}$)×Ne) has a magnitude at least equal to or higher than the output motive power (first target power) represented by the product of the target torque $T_{TGT}$ and the engine speed Ne at the point of time ($T_{TGT}$×Ne).

Further, the engine torque controller 12b controls the operation state of the engine 1 such that, when a starting condition for the transition control is satisfied by a changeover decision unit 13a hereinafter described, the actual output motive power torque of the engine 1 may coincide with (or come close to) the controlling target torque T at a time prior to the timing at which the clutch 2 is engaged. In other words, the control of raising the output motive power of the engine 1 is carried out in a state wherein the driving force of the engine 1 is not transmitted to the engaging element 2b of the clutch 2 as yet. It is to be noted that the controlling target torque T and the torque loss $T_{LOS}$ calculated here are transmitted to the generator controller 15.

However, the engine torque controller 12b carries out engine control using the controlling target torque T only when the charging rate C of the battery 6 is equal to or lower than a criterion charging rate $C_0$ ($C \leq C_0$). If the charging rate C of the battery 6 is higher than the charging rate $C_0$ ($C > C_0$), then the engine 1 is controlled so that the engine output motive power may become a comparatively low fixed value (for example, output motive power of such a degree that idling rotation is maintained).

The clutch controller 13 (clutch controlling unit) controls operation of the clutch 2. The clutch controller 13 includes a changeover decision unit 13a and a rotational speed difference arithmetic unit 13b.

The changeover decision unit 13a decides whether or not transition control from the EV mode or series mode to the parallel mode described above is to be carried out. The starting condition for the transition control is that the vehicle speed V that has been equal to or lower than the decision vehicle speed $V_0$ exceeds the decision vehicle speed $V_0$. Although the decision vehicle speed $V_0$ here may be a fixed value set in advance (for example, a speed of 80 [km/h]), in the present embodiment, it is assumed that the decision vehicle speed $V_0$ is set in response to the charging rate C and the battery temperature E of the battery 6 calculated by the battery controller 16 hereinafter described.

Figure 2:
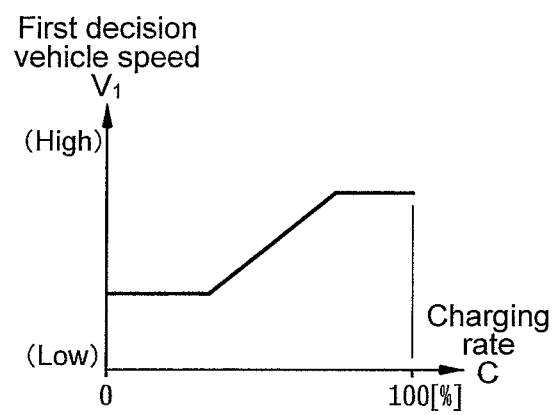
FIG. 2 are graphs relating to control by the control apparatus of FIG. 1, and wherein FIG. 2 (a) is a graph exemplifying a relationship between a charging rate and a first decision vehicle speed
Figure 2:
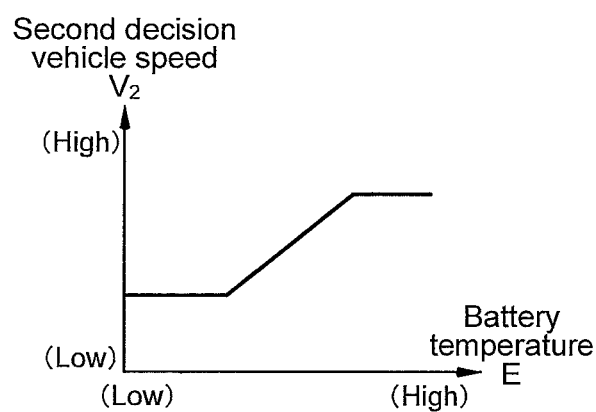

For example, in the changeover decision unit 13a, a control map for calculating a first decision vehicle speed $V_1$ using the charging rate C as an argument and another control map for calculating a second decision vehicle speed $V_2$ using the battery temperature E as an argument are stored in advance. The control maps are exemplified in FIG. 2(a) and FIG. 2(b). The first decision vehicle speed $V_1$ and the second decision vehicle speed $V_2$ are individually set to values that increase as the charging rate C becomes higher or as the battery temperature E becomes higher. Thereafter, the changeover decision unit 13a decides a starting condition for the transition control using a lower one of the first decision vehicle speed $V_1$ and the second decision vehicle speed $V_2$ as the decision vehicle speed $V_0$.

It is to be noted that the starting condition for the transition control may be decided based not only on the vehicle speed V but also on the charging rate C of the battery 6, the accelerator opening D and so forth. A result of the decision by the changeover decision unit 13a is transmitted to the engine controller 12 and the generator controller 15.

The rotational speed difference arithmetic unit 13b places the clutch 2 into engagement at a point of time at which synchronism of the rotational speeds of the engaging elements 2a and 2b is established after the starting condition for the transition control is satisfied. The rotational speeds of the engaging elements 2a and 2b are calculated based on the engine speed Ne and the motor speed Nm. Here, it is decided that synchronism of the rotational speeds is established, for example, when the rotational speed differences of the engaging elements 2a and 2b become equal to or lower than the criterion speed, and a control signal for applying a clutch hydraulic pressure to at least one of the engaging elements 2a and 2b is outputted.

Consequently, the engaging elements 2a and 2b move toward each other until they are engaged with each other to connect the clutch 2. Since the clutch 2 is connected in a state wherein the rotational speeds of the engaging elements 2a and 2b are synchronous with each other, no clutch slip occurs and no torque shock occurs either. Further, the rotational speed difference arithmetic unit 13b decides that the clutch 2 is engaged at a point of time after lapse of a criterion engaging time period G after the application of the clutch hydraulic pressure, and transmits it to the motor controller 14 and the generator controller 15 that the clutch 2 has been engaged.

The motor controller 14 (electric motor controlling unit) controls operation of the motor 3. Here, target motor torque Tm is calculated, for example, based on the vehicle speed V, motor speed Nm, accelerator opening D and so forth. The motor 3 and the inverter 5 are controlled so that actual output torque $T_{MTR}$ of the motor 3 may be brought into coincidence with (or may approach) the target motor torque Tm.

On the other hand, when the motor controller 14 receives information that the clutch 2 has been engaged almost fully from the rotational speed difference arithmetic unit 13b, the motor controller 14 carries out control for stopping the motor 3. At this time, the motor 3 and the inverter 5 are controlled so that the output torque $T_{MTR}$ of the motor 3 decreases to zero in a criterion decreasing time period F, and, for example, control for gradually decreasing the value of current supplied to the motor 3 is carried out.

The generator controller 15 (generator controlling unit) controls operation of the generator 4. The generator controller 15 includes an electric power generation amount arithmetic unit 15a and an electric power generation torque controller 15b.

The electric power generation amount arithmetic unit 15a calculates electric power generation torque $T_{GEN}$ absorbed by the generator 4 upon transition control. The electric power generation torque $T_{GEN}$ is calculated by subtracting an output motive power lost when the rotational speeds of the engaging elements 2a and 2b are synchronized with each other from the output motive power generated by the engine 1 (Namely, the output motive power generated by the engine 1 is a theoretical maximum electric power generation amount by the generator 4). It is to be noted that the energy balance in a portion of the motive power transmission path on the engine 1 side with respect to the clutch 2 is represented in the following manner. Accordingly, energy generated by the engine 1 when the clutch 2 is not engaged as yet is recovered as electric power by the generator 4 except the energy loss in the motive power transmission path.

(generated electric power energy by generator 4)
=(energy generated by engine 1) −(loss involved in synchronization of clutch 2)

The output motive power generated by the engine 1 is calculated, for example, based on the controlling target torque T and the engine speed Ne. Meanwhile, the loss involved in synchronization of the clutch 2 is calculated, for example, based on the vehicle speed V, engine speed Ne, accelerator opening D, torque loss $T_{LOS}$ and so forth. Here, the output motive power obtained by subtracting the latter from the former is determined as the target motive power to be absorbed by the generator 4. Or, the output motive power calculated from the engine speed Ne and the target torque $T_{TGT}$ calculated by the predictive arithmetic unit 12a is determined as the target power to be absorbed by the generator 4.

The electric power generation amount arithmetic unit 15a calculates electric power generation torque $T_{GEN}$ with which the electric power generated by the generator 4 coincides with the target power to be absorbed by the generator 4 based on an electric power generation characteristic of the generator 4. The electric power generation torque $T_{GEN}$ calculated by the electric power generation amount arithmetic unit 15a is transmitted to the electric power generation torque controller 15b.

The electric power generation torque controller 15b controls the driving current of the generator 4 so that the electric power generation torque $T_{GEN}$ calculated by the electric power generation amount arithmetic unit 15a is converted into electric power by the generator 4. If the starting condition of the transition control is satisfied by the changeover decision unit 13a, then the electric power generation torque controller 15b functions so that the output motive power corresponding to the target torque $T_{TGT}$ included in the output motive power generated by the engine 1 is converted into electric power from a timing prior to the timing at which the clutch 2 is engaged.

At this time, the electric power generation amount by the generator 4 can vary in response to output motive power actually generated by the engine 1. For example, if the output motive power of the engine 1 increases or decreases in response to a variation of the accelerator opening D, then also the electric power generation amount by the generator 4 increases or decreases in response to the increase or decrease of the output motive power of the engine 1. The control for carrying out electric power generation in response to the target torque $T_{TGT}$ of the engine 1 after engagement of the clutch 2 in this manner is hereinafter referred to as "variable electric power generation control".

However, the variable electric power generation control involves two control inhibition conditions. The first inhibition condition is that the charging rate C of the battery 6 is higher than the charging rate $C_0$, and the second inhibition condition is that the decision vehicle speed $V_0$ is higher than a criterion vehicle speed $V_x$.

In the former case, since, in a state wherein the charging rate C of the battery 6 is sufficiently high, the generator 4 cannot generate electric power. Namely, the energy to be absorbed as electric power by the generator 4 decreases if the charging rate C becomes high, the energy balance in the motive power transmission path is disrupted, resulting in difficulty in synchronization of the rotational speeds of the clutch 2. Therefore, when the charging rate C of the battery 6 is higher than the charging rate $C_0$, the electric power generation torque controller 15b does not carry out the variable electric power generation control, but carries out the variable electric power generation control at least when the charging rate C of the battery 6 is equal to or lower than the charging rate $C_0$. The charging rate $C_0$ here is a charging rate proximate to that in the fully charged state (e.g. 90[%] or 95[%]).

When the charging rate C of the battery 6 is higher than the charging rate $C_0$, the electric power generation torque controller 15b controls the driving current of the generator 4 so that the electric power generation amount is fixed to a constant value. The electric power generation amount at this time is set, for example, to such a magnitude as corresponds to the output of the engine 1 in an idling state.

In the latter case, since the speed Nm of the motor 3 becomes high and the engine speed Ne after the engagement of the clutch 2 becomes high, the energy to be absorbed as electric power by the generator 4 increases. Consequently, the energy balance in the power transmission path is disrupted, resulting in difficulty to synchronize the rotational speeds of the clutch 2. Therefore, when the decision vehicle speed $V_D$ exceeds the vehicle speed $V_x$, the electric power generation torque controller 15b does not carry out the electric power generation itself. The variable electric power generation control is unleashed when at least the decision vehicle speed $V_0$ is equal to or lower than the vehicle speed $V_x$. The vehicle speed $V_x$ here is a speed, for example, equal to or higher than 100 [km/h]. When the decision vehicle speed $V_0$ is higher than the vehicle speed $V_x$, the electric power generation torque controller 15b does not carry out electric power generation.

It is to be noted that, when information that the clutch 2 has been engaged substantially fully is received from the rotational speed difference arithmetic unit 13b, the electric power generation torque controller 15b carries out control of stopping the generator 4. At this time, the driving current for the generator 4 is controlled so that the electric power generation torque $T_{GEN}$ by the generator 4 decreases to zero in the criterion decreasing time period F. Consequently, after the clutch 2 is connected substantially fully, the electric power converted by the generator 4 is decreased simultaneously when the motor 3 decreases the output power. Accordingly, while the total output power transmitted to the driving wheels 8 side remains constant and besides also the output power of the engine 1 remains constant, operation of the motor 3 and the generator 4 stops synchronously.

The battery controller 16 detects and calculates a state of the battery 6. Here, the charging rate C of the battery 6 is calculated based on the current value A, voltage value B, battery temperature E and so forth. The charging rate C is calculated, for example, using an expression or a map that defines a corresponding relationship among the current value A, voltage value B, battery temperature E and charging rate C. The value of the charging rate C obtained by the battery controller 16 is transmitted to the engine controller 12, clutch controller 13 and generator controller 15.

[3. Flow Chart]

Figure 3:
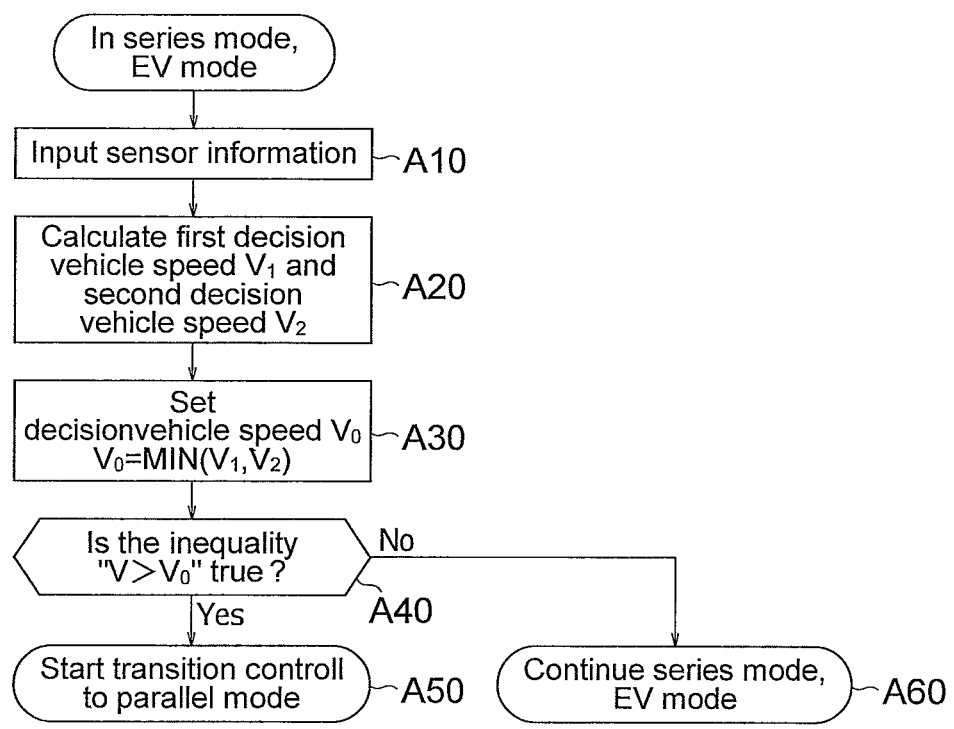
FIG. 3 is a flow chart illustrating control contents carried out by the control apparatus of FIG. 1.

In the inside of the vehicle controlling apparatus 11, a flow chart illustrated in FIG. 3 is carried out repetitively in a criterion period. This flow is for deciding whether or not the transition control from the series mode or the EV mode to the parallel mode is to be carried out.

Referring to FIG. 3, at step A10, various kinds of sensor information are inputted to the vehicle controlling apparatus 11. Then at step A20, the changeover decision unit 13a calculates the first decision vehicle speed $V_1$ based on the charging rate C and calculates the second decision vehicle speed $V_2$ based on the battery temperature E. Further, at step A30, a lower one of the first decision vehicle speed $V_1$ and the second decision vehicle speed $V_2$ is set as the final decision vehicle speed $V_0$.

At step A40, it is decided whether or not the vehicle speed V at present is higher than the decision vehicle speed $V_0$. Here, if the decision is $V > V_D$, then the processing advances to step A50, at which transition control to the parallel mode is started. On the other hand, if the decision is $V \leq V_0$, then the processing advances to step A60, at which the traveling mode till now is maintained.

Figure 4:
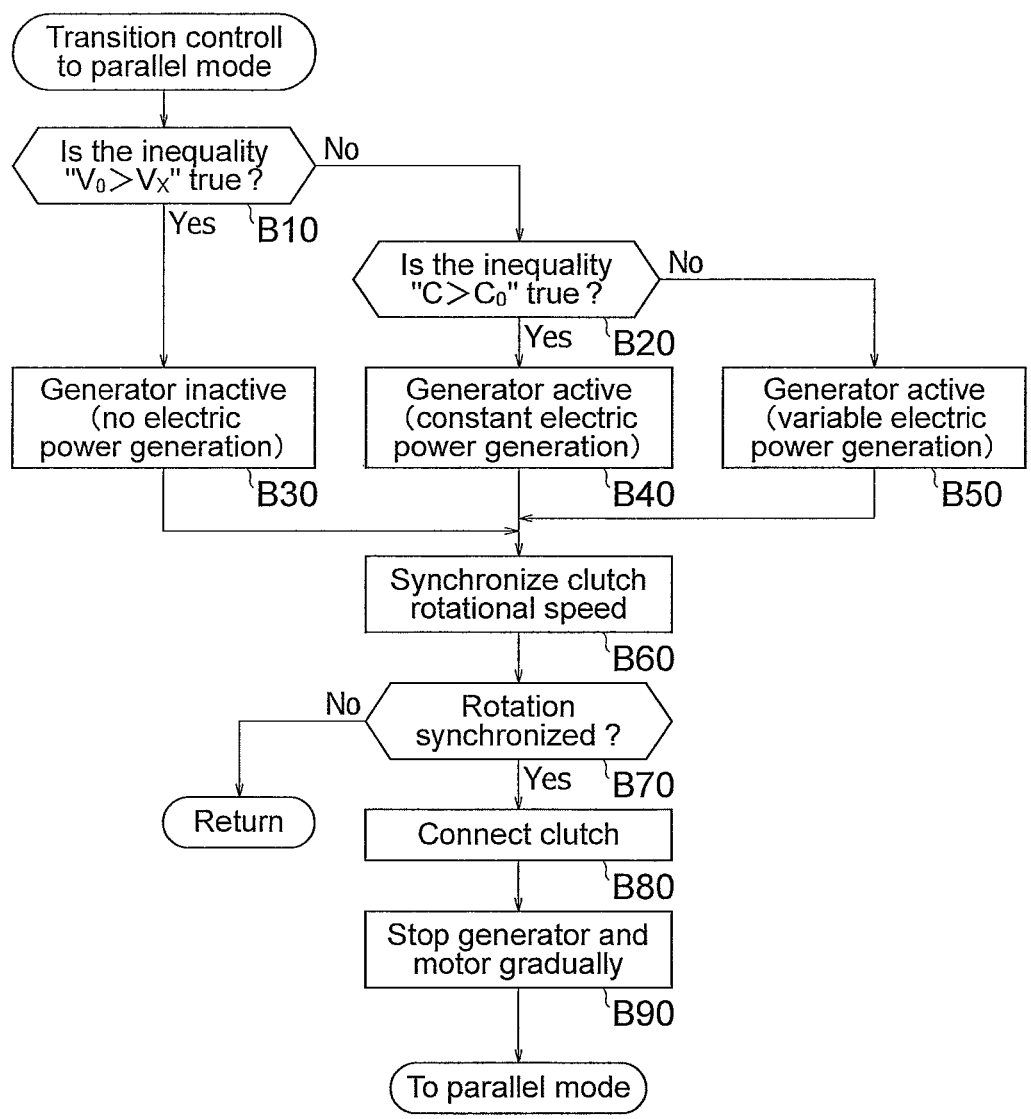
FIG. 4 is a flow chart illustrating control contents carried out by the control apparatus of FIG. 1.

FIG. 4 is a flow chart illustrating the substance of the transition control to the parallel mode. This flow is started when the processing advances to step A50 in the flow of FIG. 3 and is carried out repetitively until the traveling mode is changed to the parallel mode (till the full transition to the parallel mode).

Referring to FIG. 4, at step B10, the electric power generation torque controller 15b of the generator controller 15 decides whether or not the decision vehicle speed $V_0$ is higher than the vehicle speed V. If the decision here is $V_0 > V_x$, then it is decided that the energy that must be absorbed as electric power by the generator 4 is excessively high, and the processing advances to step B30. On the other hand, if the decision is $V_0 \leq V_x$, then the processing advances to step B20.

At step B20, the electric power generation torque controller 15b decides whether or not the charging rate C is higher than the charging rate $C_0$. If the decision here is $C > C_0$, then it is decided that the energy that can be absorbed as electric power by the generator 4 is low, and the processing advances to step B40. On the other hand, if the decision is $C \leq C_0$, then the processing advances to step B50.

At step B30, the electric power generation torque controller 15b inhibits the electric power generation by the generator 4 and then advances the processing to step B60. On the other hand, at step B40, the generator 4 is controlled so that the electric power generation amount is fixed to a fixed value, and then the processing advances to step B60. In this instance, electric current of the generated electric power is supplied directly to the motor 3. Further, at step B50, variable electric power generation control of controlling the generator 4 so that the electric power generation amount may vary in response to the output motive power generated by the engine 1 is carried out. Thereafter, the processing advances to step B60.

At step B60, control of synchronizing the rotational speeds of the engaging elements 2a and 2b of the clutch 2 with each other is carried out. In particular, the engine torque controller 12b controls the operation state of the engine 1 so that the actual output torque of the engine 1 may coincide with (or approach) the controlling target torque T. Further, the motor controller 14 controls the motor 3 and the inverter 5 so that the actual output torque $T_{MTR}$ of the motor 3 may coincide with (approach) the target motor torque Tm.

Then at step B70, the rotational speed difference arithmetic unit 13b of the clutch controller 13 decides whether or not the rotational speeds of the engaging elements 2a and 2b are in a synchronous state. If it is decided here that the rotational speeds are not in a synchronous state, then the processing advances to step B10 of the present flow again. Accordingly, until the rotational speeds of the engaging elements 2a and 2b are synchronized with each other, the driving of the driving wheels 8 by the motor 3 is continued with the clutch 2 kept in the released state. The output motive power is controlled to be relating high at this time, and besides electric power generation by the generator 4 is carried out.

On the other hand, if it is decided at step B70 that the rotational speeds of the engaging elements 2a and 2b are in a synchronous state, then the processing advances to step B80. At step B80, the rotational speed difference arithmetic unit 13b of the clutch controller 13 outputs a control signal for applying a clutch hydraulic pressure to the engaging elements 2a and 2b thereby to connect the clutch 2.

At step B90, the motor controller 14 controls the motor 3 and the inverter 5 so that the output torque $T_{MTR}$ of the motor 3 may decrease to zero in a criterion decreasing time period F, and the motor 3 stops gradually. Simultaneously, the electric power generation torque controller 15b of the generator controller 15 controls the driving current to the generator 4 so that the electric power generation torque $T_{GEN}$ of the generator 4 decreases to zero in the decreasing time period F, and also the electric power generation by the generator 4 stops gradually.

Since the output motive power from the motor 3 and the output motive power absorbed by the generator 4 decrease in synchronism with each other, the shaft torque transmitted to the driving wheels 8 side is maintained fixedly without a variation.

After both of the output motive power from the motor 3 and the electric power generation amount by the generator 4 decrease to zero, only the engine 1 transmits driving force thereof to the driving wheels 8, and the traveling mode of the vehicle 10 changes to the parallel mode.

[4. Action]

A controlling action during the transition control by the control apparatus described above is described with reference to (a) to (f) of FIG. 5. Here, the vehicle speed V before timing $t_0$ is equal to or lower than the decision vehicle speed $V_0$, and the traveling mode is the series mode. If the vehicle speed V becomes higher than the decision vehicle speed $V_0$ at time $t_0$ and the starting condition for the transition control is satisfied, then the operation state of the engine 1 is controlled so that the actual output torque of the engine 1 may coincide with the controlling target torque T. At this time, although the clutch 2 is not in an engaged state as yet, a target value of torque to be outputted by the engine 1 after the clutch 2 is engaged is predicted and calculated as target torque $T_{TGT}$. Further, the controlling target torque T becomes the sum of the target torque $T_{TGT}$ and the torque loss $T_{LOS}$ as illustrated in FIG. 5(c).

On the other hand, the electric power generation amount by the generator 4 is the difference of the output motive power of the loss from the output motive power generated by the engine 1. For example, as illustrated in FIG. 5(b), the electric power generation amount of the generator 4 at time $t_1$ corresponds to the product when the electric power generation torque $T_{GEN}$ at the time is multiplied by the number of rotations of the generator 4. At this time, the driving current for the generator 4 is controlled so that the electric power generation amount of the generator 4 may coincide with the product of the target torque $T_{TGT}$ and the engine speed Ne of the engine 1 at time $t_1$.

Consequently, the electric power absorbed by the generator 4 coincides with the difference of the output motive power of the loss from the output motive power generated by the engine 1, and all of the output motive power corresponding to the target torque $T_{TGT}$ is converted into electric power by the generator 4 as indicated by a region depicted by slanting lines in FIG. 5(c).

On the other hand, the engine speed Ne gradually rises as illustrated in FIG. 5(d) and the rotational speed difference between the engaging elements 2a and 2b of the clutch 2 decreases. In response to the decrease of the rotational speed difference, also the torque loss $T_{LOS}$ decreases, and the controlling target torque T asymptotically approaches the target torque $T_{TGT}$. A hollow portion of FIG. 5(c) indicated by a reference character X represents that the torque loss $T_{LOS}$ decreases as the engine speed Ne rises.

Thereafter, the rotational speeds of the engaging elements 2a and 2b of the clutch 2 are synchronized with each other at time $t_2$. Since the clutch 2 is connected in the state wherein the rotational speeds of the engaging elements 2a and 2b are in a synchronous state, no clutch slip occurs and no torque shock occurs either. It is to be noted that the synchronism may be decided from that the rotational speed difference between the engaging elements 2a and 2b has become equal to or lower than the criterion speed or from that the controlling target torque T and the target torque $T_{TGT}$ have become coincident with each other. Or else, the synchronism may be decided from that the engine speed Ne becomes a criterion speed $Ne_0$ corresponding to the motor speed Nm or the target torque $T_{TGT}$ as illustrated in FIG. 5(d). At time $t_2$, the engaging operation of the clutch 2 is started, and a control signal for providing a clutch hydraulic pressure is outputted from the vehicle controlling apparatus 11 to the clutch 2.

At time $t_3$ after lapse of the criterion engaging time period G from time $t_2$, it is decided that the clutch 2 has been placed into engagement, and the motor 3 and the generator 4 are controlled so that the operations thereof are stopped synchronously. The output torque $T_{MTR}$ of the motor 3 decreases with a fixed gradient so that it decreases to zero in the decreasing time period F as illustrated in FIG. 5(a). Also the electric power generation torque $T_{GEN}$ of the generator 4 decreases linearly so that it decreases to zero in the decreasing time period F as illustrated in FIG. 5(b). The output corresponding to the torque indicated by the slanting line region in FIG. 5(a) corresponds to the electric power amount corresponding to the torque indicated by a slanting line region in FIG. 5(b).

Consequently, the output motive power transmitted from the engine 1 to the driving wheels 8 side increases gradually recovering the motive power absorbed by the generator 4. Then, when the electric power generation by the generator 4 stops (the electric power generation amount reduces to zero) at time $t_4$, the output motive power of the engine 1 now corresponds to the original controlling target torque T. As a result of such control as described above, the shaft torque (torque transmitted from the clutch 2 to the driving wheels 8 side) over a period during the engagement after the engagement of the clutch 2 is stabilized as illustrated in FIG. 5(f), and just enough driving motive power is transmitted to the driving wheels 8.

[5. Effect]

(1) In this manner, upon changeover of the traveling mode on the vehicle 10 described above, before the clutch 2 is engaged, the engine output motive power is set equal to or higher than the output power required after engagement of the clutch 2. Consequently, the vehicle 10 can be made travel by the just enough engine output motive power from time immediately after the engagement of the clutch 2, and a slow-going feeling or an idly traveling feeling in acceleration can be eliminated to improve the traveling performance. It is to be noted that, if the controlling target torque T is set to a magnitude at least equal to or higher than the target torque T TGT before engagement of the clutch, then such an effect as just described is achieved.

(2) Further, in the vehicle 10 described above, electric power corresponding to the excess of the engine output motive power is absorbed by the generator 4 even before engagement of the clutch 2. In particular, if the electric power to be absorbed by the generator 4 is changed, then the magnitude of the engine output motive power transmitted to the engaging element 2a can be varied irrespective of the engagement state of the clutch 2. Accordingly, the controllability when the clutch 2 is engaged can be improved.

Further, since the engine output motive power before engagement of the clutch 2 is set to a value somewhat higher than that after the clutch element, the maximum value of the engine output motive power transmitted to the clutch 2 is equal to or higher than the output motive power required after the engagement of the clutch 2. On the other hand, if the electric power to be absorbed by the generator 4 is set higher, then the engine output motive power transmitted to the clutch 2 becomes a low value. Accordingly, the changing width of the output motive power to be transmitted to the clutch 2 can be increased. Further, since the output motive power to be transmitted to the driving wheels 8 side can be changed with a great changing width, the just enough engine output motive power can be transmitted to the driving wheels 8 even immediately after the engagement of the clutch 2. Therefore, a slow-going feeling or an idly traveling feeling in acceleration can be eliminated with certainty, and the traveling performance can be further improved.

(3) Further, in the vehicle 10 described above, the variable electric power generation control is carried out when the charging rate C of the battery 6 is equal to or lower than the charging rate $C_0$. When the generator 4 cannot generate electric power, the variable electric power generation control is not carried out, and the electric power generation amount is fixed to a fixed value and current of the generated electric power is supplied directly to the motor 3. By such control configuration, the energy balance in the motive power transmission path can be controlled to a favorable state with a high degree of accuracy, and the numbers of rotation of the engaging elements 2a and 2b of the clutch 2 can be synchronized readily with each other and besides the output motive power controllability after engagement of the clutch 2 can be improved further.

(4) Further, in the vehicle 10, when the motor 3 is stopped after engagement of the clutch 2, the motor 3 and the generator 4 are controlled so that the operations thereof stop synchronously. For example, the output torque $T_{MTR}$ of the motor 3 decreases with a fixed gradient such that it becomes equal to zero in the decreasing time period F as illustrated in (a) and (b) of FIG. 5, and also the electric power generation torque $T_{GEN}$ of the generator 4 decreases with a fixed gradient such that it becomes equal to zero in the decreasing time period F. On the other hand, the controlling target torque T of the engine I can be controlled independently of the operation state of the motor 3 and, for example, in the example illustrated in FIG. 5(c), remains fixed without any change.

By causing the operation of reducing the output motive power of the motor 3 and the operation of reducing the output motive power to be converted into electric power by the generator 4 to interlock with each other in this manner, the shaft torque to be transmitted to the driving wheels 8 can be readily maintained fixedly without changing the output motive power of the engine 1. Consequently, smooth transition to the parallel mode can be carried out. Further, while, for example, in a conventional hybrid vehicle, it is necessary to increase the output motive power of the engine 1 in short time after engagement of the clutch 2, in the vehicle 10 described above, this is not necessary. Accordingly, the driving torque after clutch engagement can be stabilized and the traveling performance can be improved.

(5) Further, in the vehicle 10 described above, when the rotational speeds of the engaging elements 2a and 2b of the clutch 2 are synchronized with each other, an operation for engaging the clutch 2 is carried out. Accordingly, occurrence of a clutch slip can be prevented and occurrence of a torque shock can be prevented. Further, according to the variable electric power generation control, only the output motive power required to synchronize the rotational speeds of the engaging elements 2a and 2b with each other is transmitted to the engaging element 2a of the clutch 2 on the engine 1 side. Therefore, the accuracy in control can be improved, and the rotational speeds of the engaging elements 2a and 2b can be synchronized with each other in a comparatively short period of time.

(6) Further, in the vehicle 10 described above, changeover of the traveling mode is carried out based on the vehicle speed V, and the parallel mode is set upon traveling at a comparatively high speed from that in the EV mode and the series mode. Generally, since the motor 3 can output stabilized high torque in a low speed region in comparison with the engine 1, by utilizing the traveling mode wherein the motor 3 is used principally in the low speed region, the starting performance of the vehicle 10 can be improved. Meanwhile, since, in a middle or high speed region, the output torque of the engine 1 increases while the output torque of the motor 3 decreases, the energy efficiency or the motion performance of the vehicle 10 can be raised by utilizing the traveling mode wherein the engine 1 is used principally. Further, by changing over the traveling mode taking the output characteristics of the motor 3 and the engine 1 into consideration, the traveling performance of the vehicle 10 can be improved.

(7) Furthermore, upon decision of whether or not changeover of the traveling mode is required, the vehicle 10 described above calculates the decision vehicle speed $V_0$ using the first decision vehicle speed $V_1$ set based on the charging rate C of the battery 6 and the second decision vehicle speed $V_2$ set based on the battery temperature E. By such control, it is possible to always keep the charging rate of the battery 6 at a rather high value. Further, the engine 1 can be used holding back use of the battery 6 and the motor 3 under a high temperature environment as far as possible, and the life span of the battery 6 and the motor 3 can be elongated. Accordingly, the reliability of the control relating to traveling by the motor can be improved.

[6. Modifications]

While, in the foregoing description of the embodiment, the transition control upon changeover of the traveling mode from the series mode to the parallel mode is described in detail, similar control can be carried out also in the transition control from the By mode to the parallel mode. In this instance, the electric power generation torque $T_{GEN}$ before time $t_0$ in FIG. 5(b) is zero, and also the controlling target torque T before time $t_0$ in FIG. 5(c) is zero. On the other hand, after time $t_0$, a similar graph shape is exhibited.

Further, while a case is described wherein the shaft torque during the transition control is substantially fixed as illustrated in FIG. 5(f) in the foregoing description of the embodiment, the value of the shaft torque need not necessarily be fixed. For example, if the operation of the accelerator pedal is increased during transition control, then the output torque $T_{MTR}$ of the motor 3 increases and the controlling target torque T of the engine 1 increases, and also the electric power generation torque $T_{GEN}$ increase together with the increase of them. Consequently, the magnitude of the shaft torque transmitted to the driving wheels 8 exhibits a value corresponding to the operation of the accelerator pedal.

Further, since both of the output torque $T_{MTR}$ of the motor 3 and the electric power generation torque $T_{GEN}$ of the generator 4 increase, the operations of the motor 3 and the generator 4 can be synchronized with each other, namely, the output motive power of the engine 1 can be controlled independently of the operation state of the motor 3. Accordingly, a special operation is not required for the engine 1 in order to stop the motor 3, and the driving torque after the clutch engagement can be stabilized to improve the traveling performance.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 engine
2 clutch
3 motor (electric motor)
4 generator (electric generator)
11 vehicle controlling apparatus
12 engine controller
12a predictive arithmetic unit (arithmetic unit)

12b engine torque controller (engine controlling unit)
13 clutch controller (clutch controlling unit)
13a changeover decision unit (changeover decision unit)
14 motor controller (electric motor controlling unit)
15 generator controller(electric generator controlling unit)
16 battery controller

The invention claimed is:

1. A control apparatus for a hybrid vehicle, comprising:
 an engine that transmits motive power to a driving wheel of the vehicle;
 a clutch disposed on a power transmission path between the engine and the driving wheel;
 an electric motor that transmits motive power to the driving wheel on the driving wheel side with respect to the clutch;
 an arithmetic unit that calculates a first target power before engagement of the clutch upon changeover from a first traveling mode wherein the vehicle is driven by the electric motor to a second traveling mode wherein the vehicle is driven by the engine, the first target power being for driving the vehicle by the engine after the engagement of the clutch; and
 an engine controlling unit that controls output motive power of the engine to a second target power before the engagement of the clutch, the second target power being set equal to or higher than the first target power calculated by the arithmetic unit,
 wherein the second target power includes the first target power and a power loss which corresponds to a power that is lost when a rotational speed of engaging elements of the clutch are to be synchronized with each other.

2. The control apparatus according to claim 1, further comprising:
 a generator that generates electric power by the motive power of the engine to charge a battery that supplies electric power to the electric motor; and
 a generator controlling unit that drives, before the engagement of the clutch, the generator by the output motive power of the engine corresponding to the first target power to generate electric power.

3. The control apparatus according to claim 2, wherein
 the generator controlling unit controls the generator to generate electric power when the battery has a charging rate equal to or lower than a criterion value.

4. The control apparatus according to claim 2, further comprising:
 an electric motor controlling unit that controls, upon changeover from the first traveling mode to the second traveling mode, the electric motor to reduce output torque after the engagement of the clutch; wherein
 the generator controlling unit controls the generator to reduce output electric power simultaneously when the electric motor controlling unit controls the electric motor to reduce the output torque.

5. The control apparatus according to claim 1, further comprising:
 a clutch controlling unit that controls, upon changeover from the first traveling mode to the second traveling mode, the clutch to engage when a rotational speed difference between the engine side and the electric motor side of the clutch becomes equal to or lower than a criterion value.

6. The control apparatus according to claim 1, further comprising:
 a changeover decision unit that decides based on a traveling speed of the vehicle whether or not changeover from the first traveling mode to the second traveling mode is to be carried out.

7. The control apparatus according to claim 6, wherein
 the changeover decision unit decides whether or not the changeover is to be carried out based on a relationship in magnitude between a decision vehicle speed and a traveling speed of the vehicle, the decision vehicle speed set in response to a charging rate or a temperature of a second battery that is an electric power supply to the electric motor.

* * * * *